H. F. SMITH.
SPRAYING MECHANISM.
APPLICATION FILED OCT. 27, 1919.
1,397,557.
Patented Nov. 22, 1921.
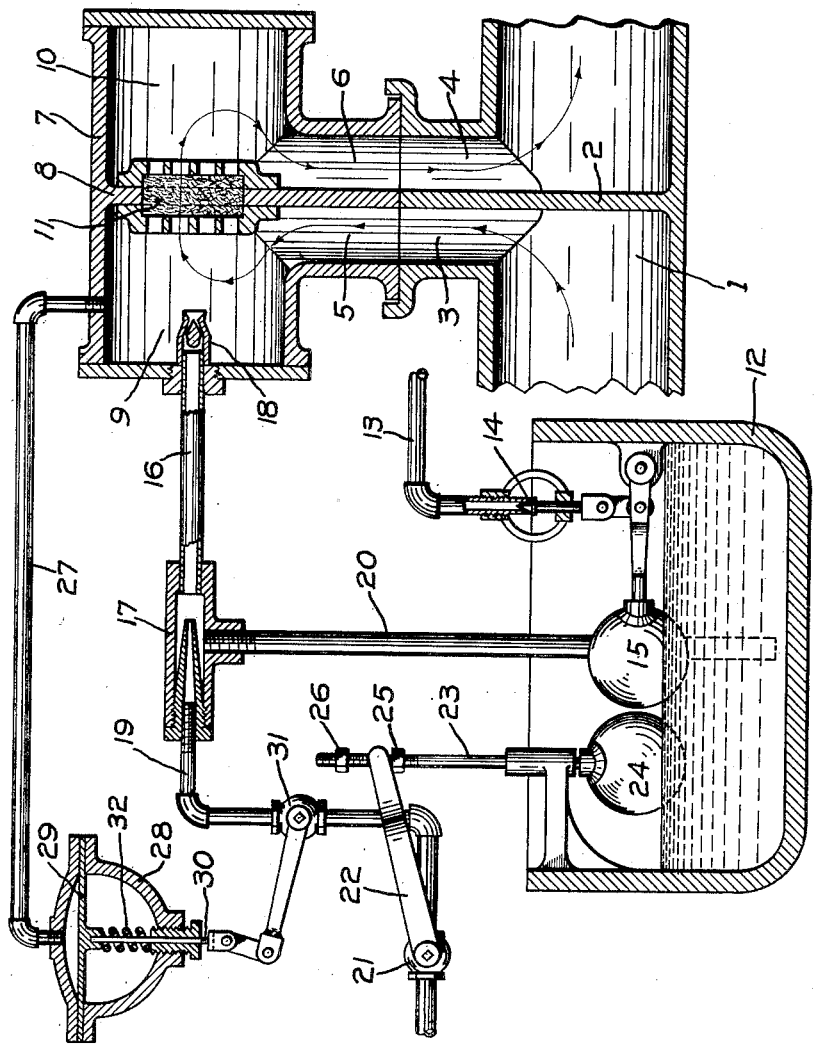

UNITED STATES PATENT OFFICE.

HARRY F. SMITH, OF DAYTON, OHIO, ASSIGNOR, BY MESNE ASSIGNMENTS, TO THE GAS RESEARCH COMPANY, OF DAYTON, OHIO, A CORPORATION OF OHIO.

SPRAYING MECHANISM.

1,397,557.  Specification of Letters Patent.  Patented Nov. 22, 1921.

Substitute for application Serial No. 195,349, filed October 8, 1917. This application filed October 27, 1919. Serial No. 333,504.

*To all whom it may concern:*

Be it known that I, HARRY F. SMITH, a citizen of the United States of America, residing at Dayton, county of Montgomery, State of Ohio, have invented certain new and useful Improvements in Spraying Mechanism, of which the following is a full, clear, and exact description.

This invention relates to fluid distributing apparatus, and more particularly to fluid distributing apparatus comprising spraying mechanism, especially adapted for cleaning filters and the like, and automatic controls therefor.

It has been found heretofore that in using filters the material being separated tends to accumulate on the surface and in the body of the filter pad, and thus clog this pad. In such cases, it is often possible to spray the pad with some suitable fluid, adapted to remove the accumulation, and restore it to its normal efficiency. Especially is this true where a gas is being filtered to remove solid or liquid particles therefrom. It is found at times, however, that even though the impurities are removed, the fluid of the spray itself will clog the filter pad. In order to obviate this, means must be provided for interrupting the flow of spray, after a suitable interval, so that all cleansing fluid may drain from the pads. These operations have been performed, heretofore, entirely by manually controlled apparatus.

The principal object of the invention is to provide a fluid distributing apparatus constructed to automatically spray a filter pad when such pad becomes unduly clogged, and, in order to prevent clogging of the filter pad from the sprayed liquid itself, to automatically interrupt such spraying operation after it has continued for a suitable length of time. And further, to so actuate this interrupting mechanism that if the filter pad is still clogged after such interruption, as will be the case if all the impurities have not been removed, spraying action will be resumed.

Other objects and advantages will be apparent from the description set out below.

For convenience in describing the present invention it will be explained with reference to filter cleaning mechanism of the type referred to, making use for purposes of description of the apparatus illustrated in the accompanying drawing, which is shown partly in section and partly in elevation to more clearly disclose the mechanical details thereof.

In the drawing, 1 is a gas main leading from the producer or any other source of gas or fluid to be purified. Extending transversely across this main is a partition 2. Extending through the side of the pipe 1, and upon opposite sides of the partition 2, are two ports 3 and 4. Attached to the pipe 1, so that its ports 5 and 6 register with the ports 3 and 4, is a filter drum or housing 7. The drum 7 has a partition 8 therein, adapted to aline with the partition 2, and thus serve as a continuation thereof when the drum is in assembled position. The partition 8 extends transversely across the drum, dividing it into two chambers 9 and 10, and is adapted to carry thereon the filter pad or member 11. From the above description, it is obvious that any gas flowing through the pipe 1 will pass upwardly through the ports 3 and 5, through the filter pad 11, and then downwardly through the ports 6 and 4, into the delivery end of the pipe 1. This type of purifying apparatus and the method of operating it are more fully described in my already issued Patents Nos. 1,099,773, June 9, 1914 and 1,140,198, May 18, 1915.

Suitably located near the filter drum is a tank 12, having an inlet pipe 13, leading thereto for supplying water or any other desired fluid. This inlet pipe is controlled by a valve 14, adjustably connected to the rod of a float 15. By properly adjusting the valve 14, any desired level of liquid in the tank 12 may be secured.

Leading into the end 9 of the drum 7 is the delivery pipe 16 of an injector 17. Attached to the inner end of the pipe 16 is a spray nozzle 18, so positioned that when liquid is passed therethrough, it will be sprayed over the pad 11 to remove impurities therefrom. Opening into the injector is a steam supply pipe 19, and leading from the side of the injector is a pipe 20, which extends into the liquid in the tank 12. Any steam passed through the pipe 19 into the injector 17 will draw water from the tank 12, which, mixing with the steam in the pipe 16, will pass out through the nozzle 18 in the form of a hot spray.

Located in the pipe 19 is a valve 21, the operating handle 22 of which is operatively connected to the rod 23 of the float 24. Positioned upon the rod 23, and upon opposite sides of the handle 22 are two stops 25 and 26. These stops are so positioned that substantial rise or fall of the float 24 can take place without any ensuing movement of the valve 21, but are so arranged that at a predetermined high level of water in the tank 12, the valve 21 will be opened, and at a predetermined low level will be closed.

In other words, as the inflow of water into the tank 12 raises the float 24, the stop 25 will first be brought into contact with the operating handle 22, and will move that handle so that when high level of water in the tank is reached, it will have opened the valve 21 to thus provide unobstructed flow of steam in the pipe 19 therethrough. And conversely, when the supply of water in the tank is falling, as where the injector is operating to remove water through the pipe 20, the stop 26 will be brought into contact with the handle 22, and upon continued downward movement of the float, will, when a sufficiently low level of water in the tank is reached, have so moved that handle as to bring about a complete closing movement of the valve 21.

Leading from the end 9 of the drum 7 is a pipe 27, the opposite end of which opens into one side of a diaphragm regulator 28. The diaphragm 29 of the regulator 28 has attached thereto a rod 30, which is operatively connected to a valve 31, located in the steam supplying pipe 19 and adapted to control the passage of steam therethrough. Surrounding the stem 30, within the diaphragm regulator 28 is a spring 32. Any pressure in the end 9 of the filter drum 7, that is, any pressure in advance of the filter pad, will act through the pipe 27 upon the upper side of the diaphragm 29, and will tend to deform that diaphragm to actuate the valve 31. The valve 31 is so connected to the operating stem 30 that under normal conditions of pressure in 9, it will be closed, and thus prevent the flow of steam through the pipe 19. The tension of the spring 32 can be varied as desired, to thus alter the resistance of the diaphragm to deformation. In other words, if the normal pressure in 9, when the filter is in operation, is four pounds, the spring 32 can be so tensioned that it will require a pressure in excess of four pounds to cause any deformation of the diaphragm 29 tending to open the valve 31. When set for any definite pressure in 9, however, any pressure in excess of such predetermined pressure, will immediately act upon the diaphragm 29 to open the valve 31. When the valve 31 is opened, presuming that the valve 21 is also opened, the steam will immediately pass through the pipe 19 into the injector 17, and as a result, a spray of hot water will be directed against the filter pad 11. And as stated above, since the valve 21 is held open so long as the level of water in the tank 12 remains above a certain height, it is evident that opening of the valve 31 will immediately result in such a spraying action as described, which action will continue until the level of water in the tank falls sufficiently to bring about a closing of the valve 21. Since the flow of water into the tank 12 through the pipe is controlled by the float operated valve 14, any lowering of water level in the tank 12 will immediately result in an inflow of fresh water, to take the place thereof. The valve 14 is so proportioned, however, that the amount of water flowing into the tank is not sufficient to compensate for the total amount of water drawn from the tank through the injector. In other words, during operation water is drawn from the tank faster than it flows thereinto. After a substantial length of operation, it is evident, therefore, that regardless of the pressure in 9, the level of water in the tank 12 will have fallen to a sufficiently low, predetermined level, to bring about a closing movement of the valve 21, to thus automatically and arbitrarily interrupt the flow of steam through the pipe 19, to cause a cessation of the spraying operation. While the valve 21 is closed, the supply of water in the tank 12 is being replenished, and when this supply has reached a predetermined high level, the valve 21 will be again opened. If the abnormal pressure in 9 still exists, as would be true if the pad had not been properly cleansed, the valve 31 will be still held open by the diaphragm 29, and upon opening of the valve 21, spraying operation will be immediately resumed. If, however, the pad, after this first spraying, has been sufficiently cleansed to permit of the pressure in 9 returning to normal, then the valve 31 will be in closed position, and even though the valve 21 is opened, no spraying operation will take place. So long as the level of water in the tank 12 remains at the predetermined high level, however, the valve 21 will be held wide open, so that immediately upon proper actuation of the valve 31, spraying operation will be resumed.

If for any reason, even though the impurities have been removed from the pad by the spraying action, the spraying fluid itself tends to clog that pad and thus keep an abnormal pressure built up in 9, it is evident that in the absence of some mechanism for arbitrarily interrupting the spraying action, it would continue indefinitely. But, by providing such interrupting mechanism, the spraying liquid can easily drain from the pad before spraying action will be resumed. It is evident, therefore, that if an abnormal pressure continues to exist in 9, as would be the case where the pad has not been properly cleansed, spraying action will be continued intermittently until such impurities are removed; but if such abnormal pressure continues to exist only because of the spraying liquid itself clogging the pad, such interruption will permit of the draining off of such clogging liquid, with the consequent dissipation of the excessive pressure.

While I have shown and described the above mechanism as especially adapted for use in the purification of tar containing gases, it is obvious that its applicability is by no means limited to such specific use, but that it may be just as readily used for cleansing filter pads generally, so long as the impurity clogging those pads is one that may be removed by spraying. And further, it is obvious that many changes in mechanical details may be adopted, all coming within the scope of my invention. For a proper definition of the scope of my invention, therefore, reference should be had to the appended claims.

What I claim as new and desire to secure by Letters Patent is:

1. In a device of the character described, a distributing pipe; means for supplying fluid to said pipe; pressure operated means for controlling the said supplying means, constructed to maintain said supplying means in operative position during the continuance of predetermined pressure conditions at the place of delivery of the distributed fluid; and other means constructed to interrupt, at predetermined intervals, the supply of fluid to said fluid supplying pipe.

2. In a device of the character described, a fluid containing tank; a distributing pipe leading therefrom; an ejector in said pipe; a valve controlling the supply of pressure fluid to said ejector, pressure actuated mechanism for operating said valve; a second valve in advance of said controlling valve, and independent means for operating said valve after the ejector has functioned for a predetermined period, to interrupt the supply of pressure fluid to the ejector.

3. In a device of the character described, a tank for receiving liquid to be distributed, a fluid supply pipe opening into said tank, means for admitting fluid through said supply pipe so long as the fluid in the tank is below a predetermined level; a distributing pipe leading from the tank; an ejector in said distributing pipe, a pressure-fluid supply pipe connected to said ejector and to a source of supply of pressure-fluid; a pressure operated valve in said pressure-fluid supply pipe, constructed to be held in open position during the continuance of predetermined pressure conditions at the place of delivery of the distributed fluid; a second valve in the pressure-fluid supply pipe, and operating means therefor responsive to the fluid level within the tank, said means being so constructed as to open said last named valve when the fluid in the tank rises to a predetermined level and to close it when the fluid in the tank falls to a predetermined level.

4. In a fluid distributing device, a distributing pipe; means for supplying fluid to said pipe; pressure actuated means for controlling said supplying means; and means constructed to operate independently of the actuating pressure for automatically interrupting the supply of fluid after a predetermined interval.

5. A spraying device comprising a spray nozzle, means for supplying fluid to said spray nozzle, means actuated by the pressure surrounding the spray nozzle for controlling the fluid supplying means, and means for automatically interrupting the supply of fluid to said nozzle after a substantial interval.

6. In a fluid distributing device, a distributing pipe; means for supplying fluid to said pipe; pressure actuated means for controlling said supplying means; and means operable independently of the pressure governing said first named means for interrupting the supply of fluid at predetermined intervals.

7. In a device for supplying fluid to a receptacle; a fluid distributing pipe leading into said receptacle; means for supplying fluid to said pipe; means responsive to pressures within the receptacle for actuating the supplying means; and means independent of the pressure actuated means for interrupting the supply of fluid at predetermined intervals.

8. In a device for supplying fluid to a receptacle; a fluid distributing pipe leading into said receptacle; means for supplying fluid to said pipe; pressure responsive means for actuating said supplying means, said supplying means being so constructed as to function so long as pressure within the receptacle exceeds a predetermined pressure; and means independent of the pressure actuated means for interrupting the functioning of said supplying means at predetermined intervals.

9. In a device for supplying fluid to a receptacle; a fluid distributing device leading into said receptacle; means for supplying fluid to said pipe, pressure operated means for controlling the said supplying means, constructed to maintain said supplying means in operative position during the continuance of predetermined pressure conditions in said receptacle; and other means, independent of said pressure operated means, constructed to interrupt the supply of fluid at predetermined intervals.

10. A device for cleaning filters and the like, comprising a filter drum, a filter pad therein; a spray nozzle in the drum, means for supplying a cleaning fluid to said nozzle; and means actuated by the pressure in the drum in advance of the filter pad for controlling the supply of cleaning fluid to said nozzle.

11. A device for cleaning filters and the like, comprising a filter drum, a filter pad therein; a spray nozzle in the drum, means for supplying a cleaning fluid to said nozzle; pressure operated means for controlling the supply of cleaning fluid; and means for automatically interrupting the supply of fluid after a predetermined period.

12. A device for spraying filters and the like, comprising a filter drum, a filter pad therein; spraying mechanism in the drum, means for supplying fluid to said spraying mechanism; means actuated by the pressure in the drum in advance of the filter pad for controlling the supply of fluid to said spraying mechanism; and means for automatically interrupting the supply of fluid after a substantial interval.

13. A device for cleaning filters and the like, comprising a filter drum, a filter pad therein; and independent means brought into operation when the filter pad has reached a certain predetermined ineffectiveness of operation for restoring the said pad to its normal filtering condition.

14. A device for cleaning filters and the like, comprising a filter drum, a filter pad therein; and means independent of the fluid passing through the filter pad for automatically cleaning said pad when it reaches a predetermined ineffectiveness of operation.

15. A device for cleaning filters and the like, comprising a filter drum, a filter pad therein; and fluid supplying means for intermittently cleaning the filter pad without reversing the direction of flow of the fluid passing therethrough.

16. A device for cleaning filters and the like, comprising a filter drum, a filter pad therein; and automatic means for intermittently treating the filter pad with a cleaning fluid without reversing the direction of flow of the fluid passing therethrough.

17. A device for cleaning filters and the like, comprising a filter member; and means actuated in accordance with the resistance to flow through the filter member for spraying a cleaning material thereon.

18. A device for cleaning filters and the like, comprising a filter member; and means responsive to the pressure in advance of said filter member for spraying a cleaning material thereon.

19. A device for cleaning filters and the like, comprising a filter member; and means adapted to spray a cleaning material upon said filter member when the pressure in advance thereof exceeds a predetermined pressure.

20. A device for cleaning filters and the like, comprising a filter member; means adapted to spray a cleaning material upon said filter member, said means tending to function so long as the pressure in advance of the filter member exceeds a predetermined pressure; and means for interrupting the functioning of said spraying means after a predetermined interval.

21. A device for cleaning filters and the like, comprising a filter member; means adapted to spray a cleaning material upon said filter member, said means being adapted to funtion when the pressure in advance of the filter member exceeds a predetermined pressure, and tending to function so long as such predetermined pressure is exceeded; and means for interrupting the functioning of said spraying mchanism after a predetermined interval, irrespective of the pressure existent in advance of the filter member.

22. A device for cleaning filters and the like, comprising a filter member; means adapted to spray a cleaning material upon said filter member, said means being adapted to function when the pressure in advance of the filter member exceeds a predetermined pressure, and tending to function so long as such predetermined pressure is exceeded; and means for interrupting the functioning of said spraying mechanism at predetermined intervals throughout such time as the pressure in advance of the filter member exceeds the predetermined pressure.

23. A device for cleaning filters and the like, comprising a filter member; spraying mechanism for spraying a cleaning fluid upon said filter member; pressure controlled means for supplying a cleaning fluid to said spraying mechanism from a containing tank; and means for interrupting the supply of cleaning fluid to the spraying mechanism when the level of the cleaning fluid in the tank falls to a predetermined level.

24. A device for cleaning filters and the like, comprising a drum containing a filter member therein; a spray nozzle in the drum adapted for spraying a cleaning fluid upon the filter member; means for feeding a cleaning fluid from a containing tank to the spray nozzle, said means including an injector; means responsive to the pressure in advance of the filter member for actuating said injector; and separate means for interrupting the functioning of said injector when the level of the fluid in the tank falls to a definite level.

In testimony whereof I affix my signature.

HARRY F. SMITH.

Witnesses:
Thomas Cureton,
Alvina Lehman.